Figure 1:
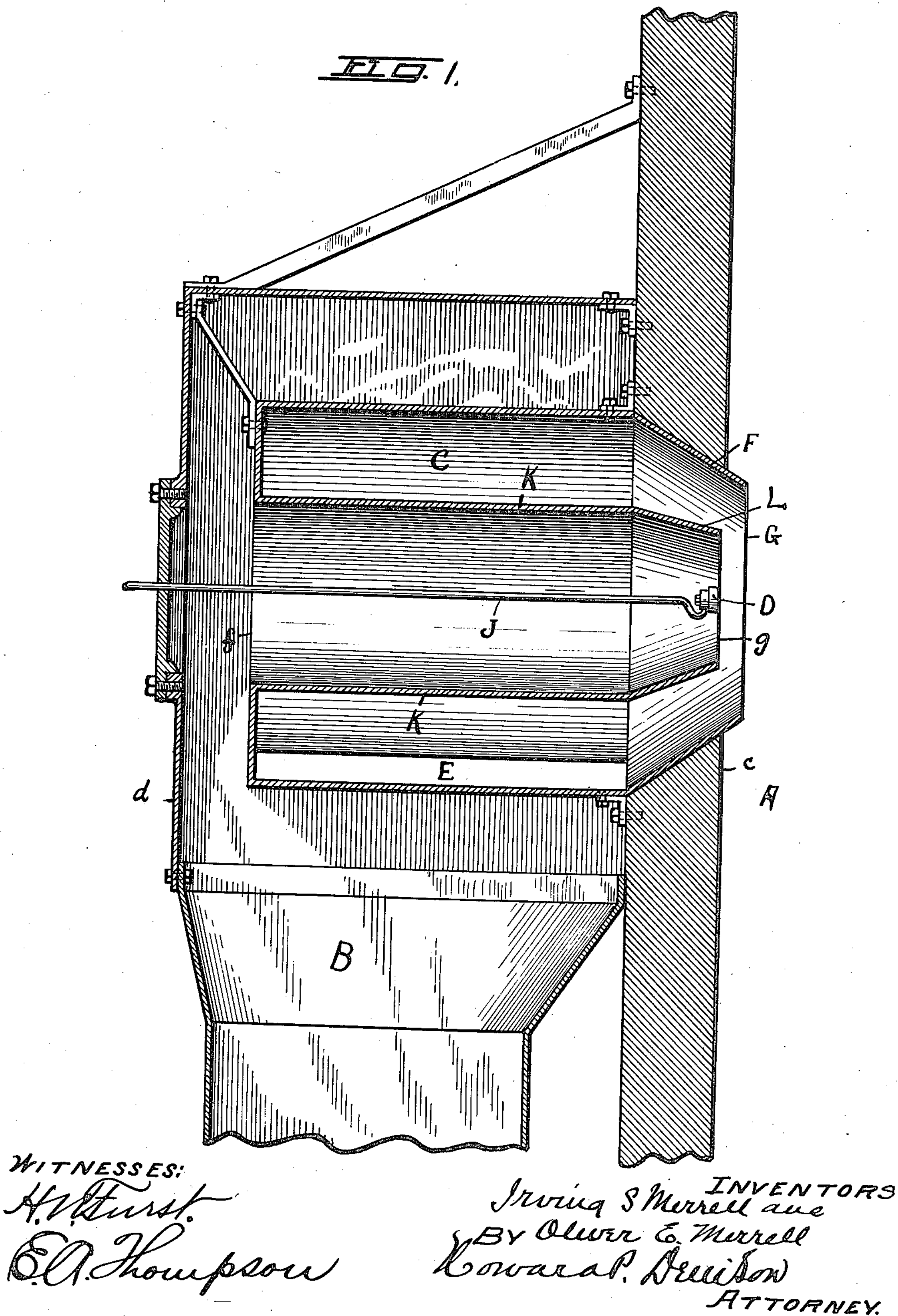

I. S. & O. E. MERRELL.

DESICCATING PROCESS.

APPLICATION FILED DEC. 11, 1914.

1,141,879. Patented June 1, 1915.

2 SHEETS—SHEET 1.

WITNESSES:
H. V. Furst.
E. A. Thompson

INVENTORS
Irving S Merrell and
Oliver E. Merrell
BY Howard P. Denison
ATTORNEY.

I. S. & O. E. MERRELL.
DESICCATING PROCESS.
APPLICATION FILED DEC. 11, 1914.

1,141,879.

Patented June 1, 1915.
2 SHEETS—SHEET 2.

WITNESSES:
H. W. Furst.
E. A. Thompson

INVENTORS
Irving S. Merrell &
Oliver E. Merrell
BY Howard P. Denison
ATTORNEY.

UNITED STATES PATENT OFFICE.

IRVING S. MERRELL AND OLIVER E. MERRELL, OF SYRACUSE, NEW YORK, ASSIGNORS TO MERRELL-SOULE COMPANY, OF SYRACUSE, NEW YORK, A CORPORATION OF NEW YORK.

DESICCATING PROCESS.

1,141,879. Specification of Letters Patent. Patented June 1, 1915.

Original application filed April 4, 1910, Serial No. 553,444. Divided and this application filed December 11, 1914. Serial No. 876,634.

*To all whom it may concern:*

Be it known that we, IRVING S. MERRELL and OLIVER E. MERRELL, citizens of the United States, and residents of Syracuse, in the county of Onondaga, in the State of New York, have invented new and useful Improvements in Desiccating Processes, of which the following, taken in connection with the accompanying drawings, is a full, clear, and exact description.

This invention relates to a process for obtaining the solids from organic liquids in the form of a substantially dry powder which may be returned again to its original liquid form by the addition of a suitable amount of water without any substantial impairment of the distinguishing characteristics of the original liquid, and is a division of our pending application Serial No. 553,444, filed April 4, 1910.

The invention is especially applicable to and intended for the drying of organic liquids having a high moisture content, such as milk and eggs. If the milk is treated, it may be in its original condition, or the cream may be first removed; and, in either case, the milk (whole or skimmed) may be condensed or concentrated before subjecting it to the desiccating operation. Cream may also be dried to a powder by the new process.

The present process is an improvement upon the invention set forth in United States Letters Patent of Robert Stauf, No. 666,711, January 29, 1901. The successful and commercial drying to a powder of such organic substance as milk and eggs having a high moisture content by the spraying process requires that there should be employed a large volume of air in proper moisture absorbing condition and that the drying should be wholly accomplished before the powder is separated from the air and collects upon the receiving or collecting surfaces. It is also desirable that the temperature of the current of drying air should be as low as consistent with proficiency to avoid any substantial alteration in the characteristics of the desiccated product. Also, it is important for commercial practice that the desiccating chamber should be small and that the rapidity of the operation should be great in order that a large amount of the organic liquid should be dried within a given length of time.

The present application relates specifically to a new desiccating process for the economic and efficient production of a dried powder from organic substances such as milk and eggs, in which the normal characteristics are substantially preserved.

Suitable apparatus for carrying out the new process is illustrated in the accompanying drawings wherein—

Figure 2:
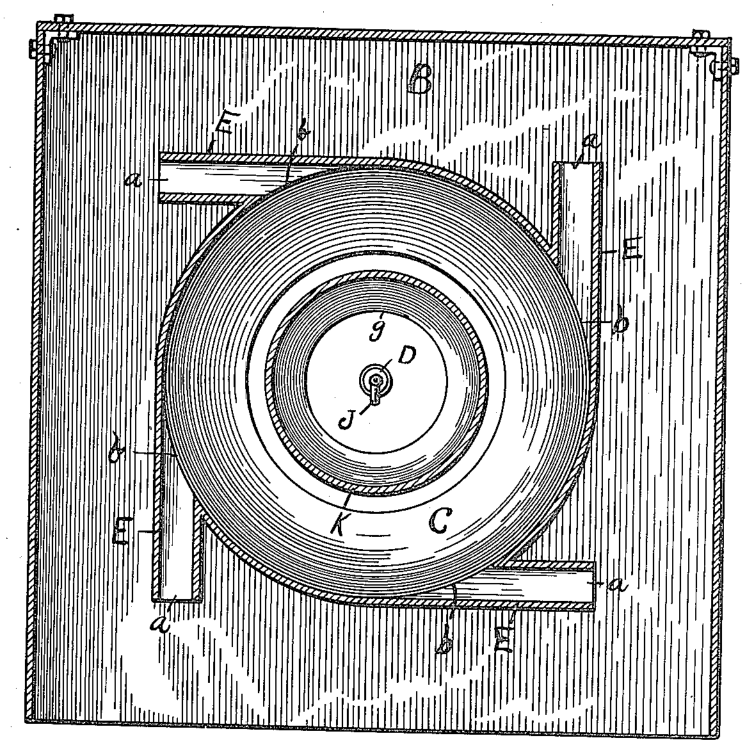
Figure 3:
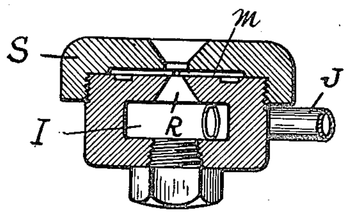

Figure 1 is a longitudinal sectional view of so much of the apparatus as is necessary for an understanding of the invention. Fig. 2 is a vertical cross section. Fig. 3 is a detail section of the liquid spray nozzle.

A is the desiccating chamber; B is a wind trunk through which heated air is forced into the desiccating chamber by a suitable air blower or pump; C is an air whirling chamber between the wind trunk and the desiccating chamber; and D is a spray nozzle for the organic liquid, such as milk or eggs, which sprays the liquid into the desiccating chamber within an envelop of the whirling air delivered by the air whirling chamber C.

The air whirling chamber is circular in cross section, and it receives heated air from the trunk B, through a plurality of tangential inlet channels E, E. These channels are shown as four in number equally spaced around the air whirling chamber and of equal capacity. Each channel extends the length of the cylindrical part of the chamber C, and each has a mouth *a* communicating with the interior of the trunk B, and a discharge port *b* communicating with the interior of chamber C. The air is forced from the trunk through these tangential channels and is set into rapid whirling motion by the cylindrical walls of the air whirling chamber. The axis of chamber C, as shown, is horizontal and at right angles to one of the walls *c*, of the desiccating chamber A. The passage F from the chamber C to chamber A, is conical; so that the outlet opening G of chamber C is a circle of less diameter than that of chamber C. The plural equally spaced channels E insure a uniform distribution of the air; and the contracted outlet adds to its discharge velocity. The whirling air passes spirally through and out of chamber C, and issues into the desiccating chamber in the form of an expanding rotating and advancing volume of air of large capacity enveloping and surrounding the portion of the interior of the desiccating chamber into which the liquid is sprayed by a nozzle D.

The spray nozzle may be either an air spray nozzle, or may be a hydraulic pressure spray nozzle like that set forth in application for Letters Patent of the United States Serial Number 316,115, filed May 10, 1906, of Paul Bevenot and Edward De Neveu, which application, since the filing of the original application of which this is a division, has issued in Letters Patent No. 1,020,632 dated March 19, 1912. The spray nozzle as shown in said patent of Paul Bevenot and Edward De Neveu, and as shown herein, comprises a body I into which the milk is introduced tangentially at a pressure of—say 150 to 200 atmospheres. This body I is cylindrical and has an interior height substantially equal to the height of the incoming or inlet tube J. The bottom or rear wall of the nozzle is closed by a removable screw to enable its interior to be readily cleaned. The front wall terminates in a centrally disposed conical opening R over which screws a cap S. A space is left, as indicated, between the cap and the body of the nozzle in which there is placed a ring of leather or similar material to form a tight joint, the said ring pressing against a thin disk —*m*— of steel, nickeled steel or similar material. In the center of this disk there is formed a very small opening, preferably from one-tenth to three-tenths of a millimeter in diameter, according to the density of the mixture of milk or the milk itself, which is to be desiccated. In place of steel or nickeled steel, a perforated stone, such as a ruby or a sapphire, may be used for replacing the disk. The cap may be constructed of substantial dimensions so as to resist the pressure, and the threads for connecting the same may be several in number to insure that a tight joint will result.

The liquid is projected into the interior of the nozzle under suitable pressure, generally 150 to 200 atmospheres, depending upon the density of the milk in a tangential manner, and is turned by the curvature of the wall, in a circular path within the interior of the nozzle, with a high velocity. It escapes by the central orifice, and by reason of the fact that the thickness of the disk is very small, the orifice through which the milk escapes does not have the effect of guiding the liquid as it passes through, so that a rotary or whirling motion is imparted to the ejected mist. In this way the milk is dissipated in all directions as it passes under the nozzle, the dissipation being largely due, of course, to the centrifugal force developed in the particles of the liquid by its high velocity developed in a circular path within the nozzle. In this way the milk is thrown into a very finely divided condition in such a way as to produce a mist and not merely a fine spray.

The rear wall *d* of the trunk B, is back of the rear wall *e* of the air whirling chamber C. The tube J is surrounded by a cylindrical drum K, centrally located within the air-whirling chamber and open at its rear (at *f*) to the trunk B. At its forward end it has an air discharge cone L within the cone F, so that it has a contracted opening *g*, into the desiccating chamber A. The drum K, thus provides direct air passages surrounding the nozzle supporting tube J from trunk B to the chamber A. The drum K, converts chamber C into an annular passage with concentric outer and inner walls, thus aiding materially in the production of the whirling current of air. The angle of cone F is more acute than that of cone L, thus contracting the discharge opening G of chamber C, and thereby retarding the escape of the air.

In order that the process and apparatus may be fully understood, the details of one practical installation will be given. A volumetric air blower capable of driving a large volume of air is employed having a blower discharge of one hundred and thirty three (133) square inches; and the blower speed is fourteen hundred (1400) revolutions a minute. This requires about four (4) horse power. The air pressure within the trunk B is three quarters (.75) ounces per square inch. Such a blower will deliver about twenty-five hundred (2500) cubic feet of air per minute to the desiccating chamber. The internal length from front to rear of the trunk B is twenty-four (24) inches and its width is thirty-two (32) inches. The internal diameter of chamber C is twenty (20) inches, and the length of the cylindrical part of said chamber is nineteen and one-half (19½) inches. The height of cone F is five and three-fourths (5.75) inches; and the internal diameter of the opening G is twelve and one-half (12½) inches. The internal diameter of the drum K is ten (10) inches; the length of the inclined wall of cone L is five and one-fourth (5.25) inches; and the internal diameter of the discharge opening of the drum is seven (7) inches. The width of each channel E is two (2) inches. The desiccating chamber A is eight and one-half (8½) feet high, eleven (11) feet long from the air-inlet G to the opposite wall, and is eight (8) feet wide. The moisture laden air passes out through any suitable screened opening or foraminous dust collector, such as that of the Merrell, Gere and Merrell United States Letters Patent No. 860,939, July 23, 1907. The air is introduced within the trunk B after being heated by passage over steam coils, the heating being such that the average temperature within the chamber A is one hundred and sixty-four (164) degrees Fahrenheit. The screened outlet from the desiccating chamber, the air blowers, and the heating coils are not shown since they may be same as in said Merrell, Gere and Merrell patent. These details are subject to variation depending upon practical conditions, such as the initial dryness of the air, the amount of moisture in the milk or other organic liquid, the quantity to be treated, and the pressure in the steam coils. The amount of air supplied must be regulated to correspond with its initial condition, the heating effect of the steam coils and the character and quantity of the liquid to be treated; expertness in which can be secured only through practical experience.

In operating the present improved process, the whirling air in large volume issues from the whirling chamber into the desiccating chamber. On entering the desiccating chamber the whirling air expands to cover a large volume of space and during its passage through the desiccating chamber toward the escape outlet, the whirling air maintains its rotation and advances spirally. The general effect is to thoroughly agitate and spread the rotating mass of air so that the incoming heated, rotated air occupies a large proportion of the space of the desiccating chamber. Into the middle of this rotating and agitated advancing mass of moisture absorbing air, the organic liquid is forced by the propelling action of the spraying device, which imparts to the liquid a whirling or rotary movement. The force of the spray added to the direct current of air through the drum prevents any portion of the liquid being carried back into the drum or into the air whirling chamber due to back eddies created by the rotating air. The spray, to which a whirling motion is imparted by the spray nozzle, enters the desiccating chamber enveloped and surrounded by the whirling envelop of heated air and no particle of the spray can reach the walls of the desiccating chamber except by passing through this whirling envelop. In such passage each particle of spray must pass through an extended path, since as soon as a particle of spray strikes the whirling envelop it is carried around and is not permitted to drop directly by gravity on to the floor of the desiccating chamber. The whirling air is detained within the desiccating chamber by reason of its rotary motion, there being no direct passage of the rotating air from the air whirling chamber to the discharge outlet of the desiccating chamber. Hence, the spray is subjected to a long exposure to the heated whirling envelop of air into the middle of which the spray is driven, and there is a thorough dissipation of the spray so that every particle thereof is subjected to prolonged contact with moisture absorbing air. The result is that when the powder escapes from the air whirl and is eventually deposited upon the outlet screen or upon the walls of the desiccating chamber it is so completely dried that it contains no amount of moisture which is sufficient to cause any deterioration in the quality of the powder when kept for a prolonged period of time. Indeed, in the case of milk, it is practicable to so dry the milk powder that no moisture can be ascertained to be present beyond the water of crystalization of the milk sugar.

The new process consists in ejecting the organic liquid by means of a spray nozzle or nozzles, which impart to the liquid a whirling or rotary motion, into an enveloping whirling mass of moisture absorbing air during the passage of such air through a desiccating, separating and collecting chamber. The dry powder is collected within the desiccating chamber and on its outlet screen separated from the air current; while the air and vapor are discharged through the screened outlet separately from the dry powder.

The surrounding air drum K enveloping the spray nozzle or nozzles is important and useful in any situation where a whirl is imparted to the spray no matter how produced. The whirling action creates a vortex causing an inrush of air which results in the deposit of adhering particles of substance treated upon the spraying apparatus which gradually build up to a sufficient mass to clog each spray nozzle and stop its operation. This occurs in the absence of the drum K. With this drum present this difficulty is obviated since the direct current of enveloping air breaks the vacuum at the center of the vortex and entirely prevents the deposit of particles of the substance treated on the spraying apparatus.

The operation of this process is particularly efficient when, as is the case with the apparatus shown, the whirling movement imparted to the liquid by the spray nozzle causes the liquid to move in the same direction as and within the whirling rotating current of air.

What we claim is:

1. The process of desiccating liquids containing organic elements, which consists in creating a whirling current of air within a desiccating chamber, creating a whirling spray of the liquid to be desiccated and bringing such air and spray into contact so that the liquid constituents are vaporized.

2. The process of desiccating liquids containing organic elements, which consists in creating a whirling current of air within a desiccating chamber, forcibly injecting the liquid into said chamber in the form of a finely divided whirling mist.

3. The process of desiccating liquids containing organic elements, which consists in creating a whirling current of air within a desiccating chamber, forcibly injecting within such whirling air the liquid in the form of a finely divided whirling mist.

4. The process of desiccating liquids containing organic elements which consists in creating a whirling current of air within a desiccating chamber, subjecting the liquid to a high pressure, imparting to the liquid under pressure a whirling motion, forcing the whirling liquid by such pressure through a minute orifice whereby it is ejected in the form of a finely divided mist into the said whirling current of air and thereby held in suspension during a period necessary to practically completely vaporize the liquid constituents.

5. The process of desiccating liquids containing organic elements which consists in creating a whirling current of air within a desiccating chamber, said current traveling in a pathway of gradually increasing diameter from the place of projection into the chamber, subjecting the liquid to a high pressure, imparting to the liquid under pressure a whirling motion, forcing the whirling liquid by such pressure through a minute orifice whereby it is ejected in the form of a finely divided mist into the said whirling current of air and thereby held in suspension during a period necessary to practically completely vaporize the liquid constituents.

In witness whereof we have hereunto set our hands this 28th day of November, 1914.

IRVING S. MERRELL.
OLIVER E. MERRELL.

Witnesses:
E. A. Thompson,
Viola Howland.